Patented Jan. 15, 1946

2,393,202

UNITED STATES PATENT OFFICE 2,393,202

WAXLIKE COMPOUNDS

Lou A. Stegemeyer, Cincinnati, Ohio, assignor to Emery Industries, Inc., Cincinnati, Ohio, a corporation of Ohio No Drawing. Application May 5, 1943,
Serial No. 485,777

4 Claims. (Cl. 260—404)

This invention relates to the production of a hard, waxy body suitable for use in polishes and for like purposes.

The principal object of the present invention has been to provide high melting, hard, wax-like materials, derived from abundant and relatively cheap materials. The waxes so provided are of constant and uniform character and do not require any refining treatment.

The waxes of the invention may vary in color from very light tan to darker tan and are odorless in the solid state. They have dense, waxy structures and show fractures like those of hard, natural waxes such as carnauba wax. The waxes have melting points ranging from substantially 120° C. up to 130° C. and are soluble in hot solvents such as benzine, turpentine and solvent naphtha, these solutions setting to smooth pastes on cooling. They are not affected by boiling water and are weather resistant. When applied to smooth surfaces in thin films these waxes take on a high gloss when polished. The waxes may be dispersed in water to form stable emulsions.

Waxes of such nature find various uses in industry. In polishes they supply the necessary, hard, water and weather proof coating capable of taking on a high gloss when polished. They may be used in leather dressings for the finishing of leather goods. They also may be used in molded products such as phonograph records and insulating plastics.

I have discovered, briefly, that such wax-like bodies are formed on reacting amides of long chain aliphatic fatty acids such as commercial stearic acid with formaldehyde or formaldehyde forming substances under certain conditions of heating. Commercial stearic acid is a mixture of approximately 45% stearic and 55% palmitic acids and the amides obtained therefrom would be in corresponding proportion. Such mixed amides will be referred to hereinafter as stearamide.

By virtue of the simple method through which the products are prepared they are of constant uniform character and light colored waxes may be obtained without refining treatments. These bodies have a melting point which is higher than most waxes of natural origin and may be economically produced because of the availability of the raw materials from which they are formed.

In the preferred embodiment of the invention the reactants, such as stearamide and para formaldehyde, are heated together at atmospheric pressure, permitting escape of any volatile reaction products, but avoiding contact with air to prevent discoloration. The temperature of the mix is kept relatively low during the earlier part of the reaction to avoid loss of formaldehyde by escape from the mix before reacting. As the reaction progresses, the melting point and hardness of the mix increases. The essential part of the procedure to obtain a hard, wax product, is to finally maintain the mix at an elevated temperature for several hours. If this is not done, the product will not have the desired dense, waxy structure and will not attain the high M. P.

I am aware of the fact that reactions between amides and formaldehydes have previously been suggested. In all instances with which I am familiar, however, the reaction takes place at low temperature, for example, at 65° and in a solvent, according to the United States Patent No. 2,212,654, and at a correspondingly low temperature in the United States Patents Nos. 2,242,051 and 1,952,008. The No. 2,242,051 patent suggests the use of a dialdehyde, while the No. 1,952,008 patent calls for the use of a primary amine. In such instances soft products are obtained while, according to the present invention, reaction is caused to take place at a considerably higher temperature and the effect is manifested in the production of hard, wax-like bodies of high melting point.

The mechanism of the reaction of the present invention is not fully understood, but we believe that condensation occurs with evolution of water, at least in the earlier stages of the reaction. In the preferred process the mixture is first heated for an initial period, usually about an hour more or less, to a temperature which increases gradually from 100° C. to about 130° C. After this initial treatment the temperature is increased fairly rapidly to a temperature of 160° to 170° C. which is maintained for a period of time sufficient to produce the desired product. Whatever the reaction, however, heating at an elevated temperature in the latter stages of the reaction for a period of several hours is essential for the formation of the hard, dense wax product.

While use of the amide of commercial stearic acid is preferred, it being readily obtainable at economical cost, amides of pure stearic or palmitic acids, or amides of higher chain length aliphatic fatty acids such as the $C_{20}$ and $C_{22}$ acids obtained from hydrogenated fish oil, may be used. The use of para formaldehyde as a source of formaldehyde is preferred as most convenient for use, but other formaldehyde forming substances may be used.

The preferred ratio of formaldehyde to amide is approximately 6 parts to 100 parts, although appreciably more or less may be used, i. e., 4 to 12 parts formaldehyde by weight to 100 parts amide.

Aside from an explanation of the chemical mechanisms involved in the process, the following example will illustrate the practice of the invention.

*Example*

Six parts of para formaldehyde is added to 100 parts of melted stearamide in a still or other suitable vessel permitting escape of water of reaction but not permitting access of air to the reactants. The mixture is heated at such temperature as to cause slow evolution of formaldehyde from the para formaldehyde. Agitation may be used but is not essential. The temperature is gradually increased, avoiding such rapid increase as to drive off formaldehyde before it reacts. An initial heating period of about 1 hour, increasing from 100° C. to 130° C., has been found suitable. The temperature is then increased fairly rapidly to 160–170° C. and maintained for 3 hours or more until a sample of the mix shows a melting point of over 120° C. and assumes a dense, hard, wax nature on cooling and setting. The heating is then discontinued and the product permitted to cool to 135–140° C. It may then be poured into molds, passed through a flaker to produce thin, brittle, chips or made into whatever form desired. The product may have a hardness of about 68 as measured by the Shore Durometer B.

Having described my invention, I claim:

1. A method of making a hard, high melting, waxy material comprising reacting an amide of a high saturated aliphatic acid containing from sixteen to twenty-two carbon atoms in the molecule with formaldehyde in the proportion of approximately four to twelve parts formaldehyde by weight to one hundred parts of amide at a temperature of approximately 100–130° C. for a period of about one hour, and thereafter heating the composition at a temperature of approximately 160–170° C. for a period of several hours, thereby producing a molten composition which when cooled provides said waxy body.

2. A method of making a hard, high melting, waxy material comprising reacting stearamide with formaldehyde in the ratio of approximately four to twelve parts of formaldehyde to each one hundred parts of stearamide at a temperature of approximately 100–130° C. for a period of about one hour, then heating the composition at a temperature of approximately 160–170° C. for a period of at least two hours, thereby providing a reaction product which is in a molten condition, and cooling said molten reaction product to provide said waxy material.

3. A method of making a hard, high melting, waxy material comprising reacting an amide of a higher saturated aliphatic acid containing from sixteen to twenty-two carbon atoms in the molecule with formaldehyde in the ratio of about four to twelve parts of formaldehyde to each one hundred parts of amide for a period of at least several hours at a temperature of approximately 160–170° C., evacuating water evolved during the reaction and continuing said heating until a molten reaction product is obtained which when cooled provides said waxy material.

4. As a new composition of matter, a hard, brittle, waxy material having a melting point of substantially 120° C. to 130° C. and having a hardness of about sixty-eight as measured by the Shore Durometer B, the said composition resulting from the reaction of substantially one hundred parts of amide of higher saturated aliphatic acid of from sixteen to twenty-two carbon atoms to the molecule and substantially four to twelve parts of formaldehyde, said product being initially reacted at a temperature of substantially 100–130° C. for a period of about one hour then at a higher temperature of approximately 160–170° C. for a period of several hours.

LOU A. STEGEMEYER.